Patented Oct. 31, 1922.

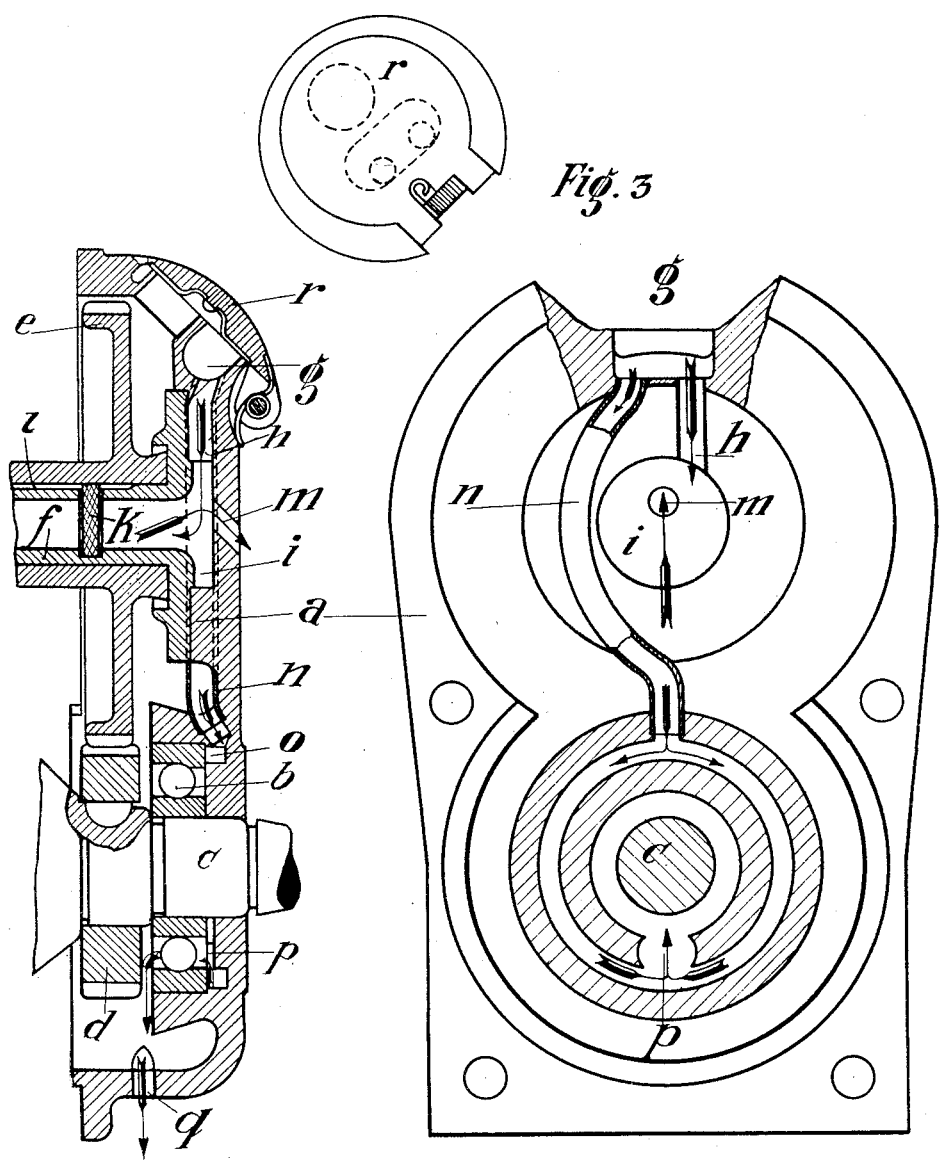

1,434,316

UNITED STATES PATENT OFFICE.

JACQUES SCHNEIDER, OF SOLOTHURN, ERNST HURLIMANN, OF ZUCHWIL, AND FREDERIC BILLON, OF SOLOTHURN, SWITZERLAND, ASSIGNORS TO THE FIRM SCINTILLA, OF SOLOTHURN, SWITZERLAND.

BEARING END PLATE FOR THE IGNITION APPARATUS OF INTERNAL-COMBUSTION ENGINES.

Application filed August 22, 1919. Serial No. 319,228.

*To all whom it may concern:*

Be it known that we, JACQUES SCHNEIDER, a citizen of the Swiss Republic, residing at Solothurn, Switzerland, ERNST HURLIMANN, a citizen of the Swiss Republic, residing at Zuchwil, Canton of Solothurn, Switzerland, and FREDERIC BILLON, a citizen of the Swiss Republic, residing at Solothurn, Switzerland, have invented certain new and useful Improvements in Bearing End Plates for the Ignition Apparatus of Internal-Combustion Engines, of which the following is a specification.

This invention has for its object to provide an improved bearing end plate for the ignition apparatus of internal combustion engines. According to this invention the improved bearing end plate comprises the bearing for the rotating part of the magnet dynamo as well as the bearing for the distributor, and comprises also the lubricating apparatus for these bearings.

The accompanying drawings illustrate a constructional example of this invention.

Fig. 1 is a longitudinal section, and

Fig. 2 is a view of the inner side of the bearing end plate in which some parts are drawn in section in order to show clearly the path of the lubricant.

Figure 3 is a plan view of the spring hinged lid placed over the oil box and distributing pipes in the upper part of the end plate.

The ball bearing $b$ situated in the lower part of the bearing end plate $a$, carries the shaft $c$ of the magnet dynamo upon which the toothed wheel $d$ is fixed. This wheel drives the distributor toothed wheel $e$ which is mounted on the hollow journal $f$ fixed to the bearing end plate $a$.

The two bearings receive their supply of lubricant from a common oil-box $g$, but their lubricating arrangements are otherwise entirely separate from each other. The oil passes to the distributor bearing through the hole $h$ into the chamber $i$, and thence into the cavity of the journal $f$ whence it passes through the small pipe $k$ to the lubricating groove $l$ situated at the highest point of the distributor bearing. An aperture $m$ in the bearing end plate $a$ serves as an overflow for the oil of the distributor.

The dynamo bearing $b$ receives its oil through the small pipe $n$ which opens into the annular space $o$. This oil passes through the aperture $p$ on to the ball races. The oil which is in excess or which has been used flows away through the hole $q$.

$r$ is a well fitting spring hinged lid of pleasing round form (Fig. 3). It prevents the entry of dirt and the overflowing of oil from the box $g$.

What we claim is:—

1. A bearing end plate for the ignition apparatus of internal combustion engines of the type including a distributor, including a bearing for the rotating part of the magneto armature, a hollow stub shaft serving as a bearing for the distributor and attached to the inner surface of said bearing end plate, thus avoiding boring the said end plate for use as a bearing for the distributor wheel shaft, and lubricating apparatus for the said bearings.

2. A bearing end plate for the ignition apparatus of internal combustion engines of the type including a distributor, including a bearing for the rotating part of the magneto armature, a hollow stub shaft serving as a bearing for the distributor and attached to the inner surface of said bearing end plate, thus avoiding boring the said end plate for use as a bearing for the distributor wheel shaft and lubricating apparatus for the said bearings, comprising a single lubricating oil container and two ducts leading in parallel therefrom respectively to the said bearings.

3. A bearing end plate for the ignition apparatus of internal combustion engines of the type including a distributor, including a bearing for the rotating part of the magneto armature, a hollow stub shaft serving as a bearing for the distributor, and attached to the inner surface of said bearing end plate, thus avoiding boring the said end plate for use as a bearing for the distributor wheel shaft, lubricating apparatus for the said bearings comprising a single lubricating oil container and two ducts leading in parallel therefrom respectively to the said bearings, and an independent oil sump with an overflow duct for each of said bearings.

In testimony whereof we have signed our names to this specification.

JACQUES SCHNEIDER.
ERNST HURLIMANN.
FREDERIC BILLON.